June 13, 1933.  A. H. KINZEL  1,913,677
GASKET
Filed Nov. 3, 1931

INVENTOR
ARCH H. KINZEL

BY

ATTORNEYS

Patented June 13, 1933

1,913,677

UNITED STATES PATENT OFFICE

ARCH H. KINZEL, OF AKRON, OHIO

GASKET

Application filed November 3, 1931. Serial No. 572,751.

This invention relates to gaskets and particularly to gaskets for use in sealing plugged openings such as those in gasoline drums and like containers.

Heretofore gaskets have been provided for this purpose comprising a shell of metal partly encasing a resilient packing such as cork. These, however, have not been entirely satisfactory since as they are flattened out by the pressure of the plug, the cork face of the gasket is to some extent forced outwardly away from the threaded joint between the plug and the opening.

The general purpose of the present invention is to provide a gasket for the purpose above set forth which includes a packing ring of cork or other suitable soft resilient packing material so sheathed with metal that the packing is forced inwardly into the threaded joint as the pressure of the plug is applied thereto.

A further purpose of the invention is to provide a sheath corrugated on the upper face of the gasket to provide resilience in addition to that provided by the packing material and to reduce the friction on the gasket as the plug is turned relatively thereto so that the gasket will not tend to become distorted out of effective sealing cooperation with the threaded joint.

The foregoing and other purposes of the invention are attained in the gasket illustrated in the accompanying drawing and described below. It is to be understood that the invention is not limited to the specific form thereof shown and described.

Of the accompanying drawing.

Figure 1:
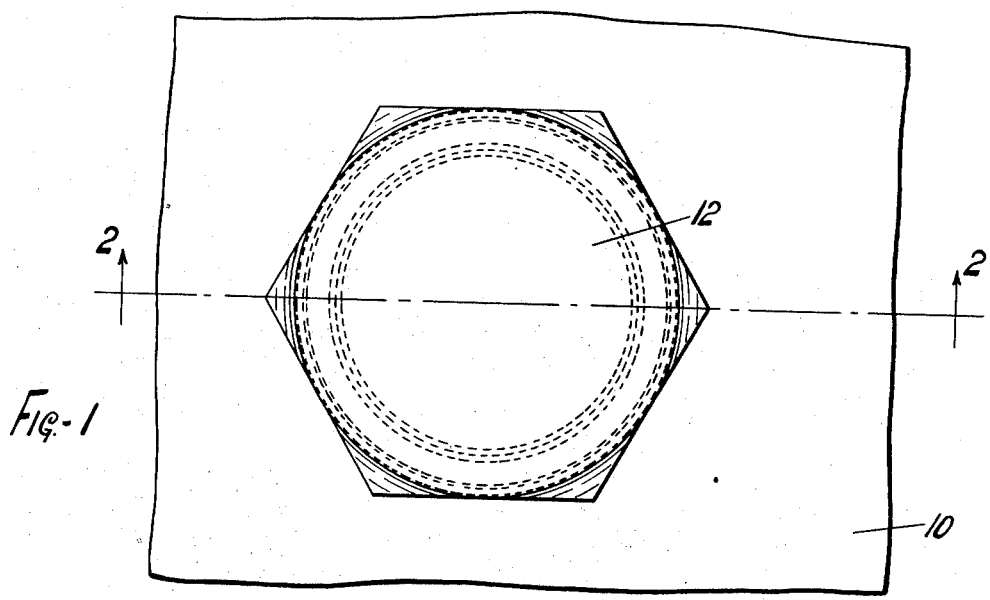
Figure 1 is a plan view showing a portion of a container provided with an opening and a plug or closure threaded therein with the improved gasket in place.

Referring to the drawing, the numeral 10 designates the wall of a container having a threaded opening 11 therein for receiving a plug 12 having a flange 13 which may be of polygonal formation whereby the plug may be screwed into opening 11 by means of a wrench (not shown). For sealing the opening, a gasket embodying the present invention is shown compressed between flange 13 and the container wall.

The improved gasket comprises a packing ring 14 of soft, resilient material such as cork covered on its upper face by a metal sheath 15 of comparatively hard, resilient sheet metal such as soft steel, copper, monel metal, etc., the sheath being corrugated on the upper face of the gasket as shown and secured to the packing ring by clenching flanges 16 and 17 engaging respectively about the outer and inner peripheries of the packing ring, the lower face of the packing ring being uncovered. The flange 16 extends down toward the lower face of the gasket somewhat more than the flange 17 which is somewhat shorter.

Figure 2:
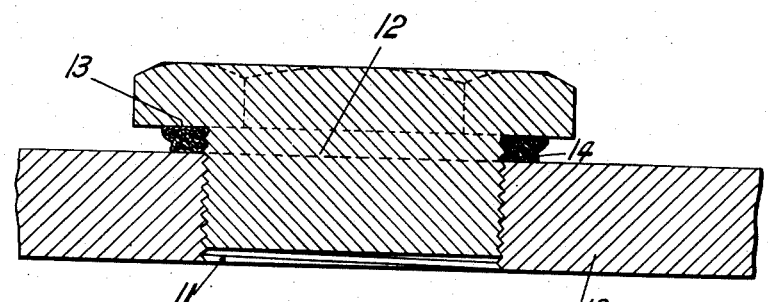
Figure 2 is a section on line 2—2 of Figure 1.
Figure 3:
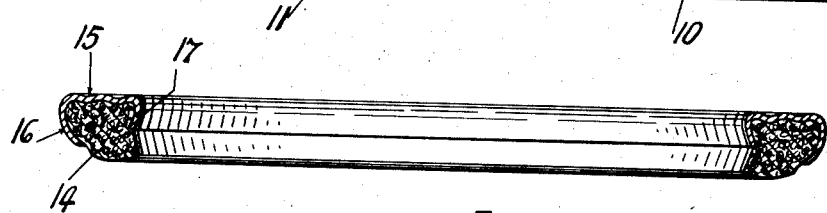
Figure 3 is an enlarged sectional view of the gasket showing the normal shape thereof.
Figure 4:
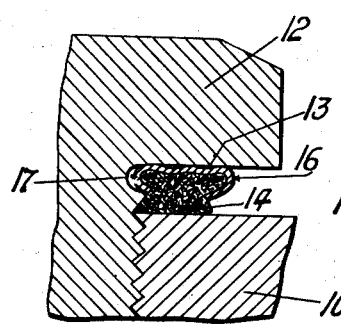
Figure 4 is an enlarged view of the right portion of Figure 2.

The packing ring of a gasket of the construction set forth in the preceding paragraph, when flattened by tightening of the plug as shown in Figures 2 and 4, will be forced by the flattening sheath inwardly against the threads of the plug as well as downwardly against the wall 10. This is due to the fact that the outer flange 16 bends inwardly as the gasket is flattened and forces the packing material inwardly beneath the shorter flange 17. The circumferential corrugations on the sheath render the gasket somewhat more resilient, providing a resilient backing for the soft packing and also reduce the friction between flange 13 and the face of the gasket whereby there is no tendency to distort the gasket out of sealing engagement as the plug is tightened.

Modifications of the invention may be resorted to without departing from the spirit thereof or the scope of the appended claims.

What is claimed is:—

1. A gasket for the purposes set forth comprising a ring of soft, resilient packing material, and a sheath of comparatively stiff, resilient sheet metal over the upper face thereof and secured to said ring by flanges clenched about the outer and inner peripheries of said ring whereby the packing material projects substantially below the flanges, the outer of said flanges being longer than the inner flange and being inwardly bent whereby when the gasket is flattened under pressure the bending outer flange will force the packing inwardly under the inner flange, the sheath over the upper face of the gasket being formed with circumferential corrugations.

2. A gasket for the purposes set forth comprising a ring of soft, resilient packing material, and a sheath of comparatively stiff, resilient sheet metal over the upper face thereof and secured to said ring by flanges clenched about the outer and inner peripheries of said ring whereby the packing material will extend substantially below the flanges, the outer of said flanges being longer than the inner flange and being inwardly bent whereby when the gasket is flattened under pressure the bending outer flange will force the packing inwardly under the inner flange.

ARCH H. KINZEL.